(12) United States Patent
Wischermann

(10) Patent No.: US 7,760,271 B2
(45) Date of Patent: Jul. 20, 2010

(54) METHOD AND CIRCUIT FOR DETERMINING THE NOISE COMPONENT IN A VIDEO SIGNAL

(75) Inventor: Gerhard Wischermann, Weiterstadt (DE)

(73) Assignee: Thomson Licensing, Boulogne (FR)

( * ) Notice: Subject to any disclaimer, the term of this patent is extended or adjusted under 35 U.S.C. 154(b) by 1579 days.

(21) Appl. No.: 10/372,498

(22) Filed: Feb. 24, 2003

(65) Prior Publication Data

US 2003/0160903 A1 Aug. 28, 2003

(30) Foreign Application Priority Data

Feb. 26, 2002 (DE) ................. 102 08 092

(51) Int. Cl.
*H04N 5/00* (2006.01)
*H04N 5/14* (2006.01)
*H04N 9/64* (2006.01)

(52) U.S. Cl. ............... 348/606; 348/607; 348/700; 348/701

(58) Field of Classification Search .......... 348/602, 348/699–701, 606–607
See application file for complete search history.

(56) References Cited

U.S. PATENT DOCUMENTS

| | | | | |
|---|---|---|---|---|
| 3,939,487 A | * | 2/1976 | Leventer | 348/701 |
| 4,581,642 A | * | 4/1986 | Poetsch et al. | 348/620 |
| 4,873,574 A | | 10/1989 | Darby | 358/139 |
| 4,884,136 A | | 11/1989 | Ninomiya et al. | 348/701 |
| 5,227,880 A | * | 7/1993 | Kim | 348/469 |
| 5,394,192 A | | 2/1995 | Hackett | 348/619 |
| 5,400,087 A | * | 3/1995 | Uramoto et al. | 348/699 |
| 5,485,222 A | * | 1/1996 | Wischermann | 348/607 |
| 5,657,401 A | | 8/1997 | De Haan et al. | 382/275 |
| 6,094,231 A | | 7/2000 | Wischer-Mann | 348/607 |

FOREIGN PATENT DOCUMENTS

| | | |
|---|---|---|
| DE | 3307687 | 9/1984 |
| DE | 4341760 | 6/1995 |
| DE | 19636867 | 1/1998 |
| DE | 69614832 | 12/2001 |
| EP | 562407 | 9/1993 |
| EP | 629081 | 12/1994 |
| EP | 801862 | 10/1997 |
| EP | 731601 | 12/2000 |
| EP | 1156681 | 11/2001 |
| GB | 2261569 | 5/1993 |
| WO | WO98/10595 | 3/1998 |

OTHER PUBLICATIONS

Christian Hentschel et al, "Noise Measurement in Video Images", Consumer Electronics, 2000 ICCE, 2000 Digest of Technical Papers, International Conference, Jun. 13-15, 2000, pp. 56-57.
Search Report attached.

* cited by examiner

*Primary Examiner*—Marsha D Banks Harold
*Assistant Examiner*—Chikaodili E Anyikire
(74) *Attorney, Agent, or Firm*—Robert D. Shedd

(57) ABSTRACT

A method for determining a noise component in a video signal is proposed, in which the difference between a delayed and an undelayed video signal is formed. In order to be able to measure the noise component as precisely as possible, the delayed and the undelayed video signal are assigned to at least two different processing channels depending on their respective amplitude. At least two peak values for the noise signal for two different amplitude ranges are determined from the absolute value of the difference between the two video signals.

Furthermore, a circuit is proposed which is suitable for implementing the method proposed.

15 Claims, 6 Drawing Sheets

| MAX 11 | MAX 12 | MAX 13 | MAX 14 | MAX 15 | MAX 16 |
| --- | --- | --- | --- | --- | --- |
| MAX 21 | MAX 22 | MAX 23 | MAX 24 | MAX 25 | MAX 26 |
| MAX 31 | MAX 32 | MAX 33 | MAX 34 | MAX 35 | MAX 36 |
| MAX 41 | MAX 42 | MAX 43 | MAX 44 | MAX 45 | MAX 46 |
| MAX 51 | MAX 52 | MAX 53 | MAX 54 | MAX 55 | MAX 56 |
| MAX 61 | MAX 62 | MAX 63 | MAX 64 | MAX 65 | MAX 66 |

Fig.2

METHOD AND CIRCUIT FOR DETERMINING THE NOISE COMPONENT IN A VIDEO SIGNAL

This application claims the benefit under 35 U.S.C. §365 of German patent application No. 10208092.5 filed Feb. 26, 2002.

FIELD OF THE INVENTION

The invention is based on a method and a circuit for determining the noise component in a video signal. In particular, the invention relates to a method for determining the noise component in a video signal according to the preamble of claim 1 and to a corresponding circuit according to the preamble of claim 9.

BACKGROUND OF THE INVENTION

A method of this type is disclosed in EP-A 0 629 081. In the case of the known method, the amplitudes of video signals which originate from two different successive frames are compared with one another. One of the two video signals is delayed in a delay device, so that the video signals are simultaneously present for processing at the inputs of a difference value and absolute value forming unit. From the measured values thus obtained, maxima are determined within suitable search windows, a minimum being determined in turn from the said maxima. In the case of unmoving pictures, the minimum obtained in this way corresponds to the sought peak value of the noise signal. If the video signal processed in this way is generated by scanning a film, the difficulty arises that the so-called film grain noise depends to a very great extent on the density of the RGB film layers. This is a consequence of the nonlinear gamma characteristic during the film processing. In the case of negative films, the film grain noise is reduced in dark regions, while the amplitude of the film grain noise is very much greater, in comparison therewith, in bright regions. With the known method, however, it is only possible to detect the smaller proportion of the film grain noise.

SUMMARY OF THE INVENTION

Taking this as a departure point, it is desirable to suggest a method which makes it possible to measure the noise signal more extensively.

This is achieved by means of a method according to claim 1.

In the case of the invention's method according to claim 1, the noise component in a video signal is determined by forming the difference between a delayed and an undelayed video signal. The method comprises the following steps:

a) the amplitude of the video signal is determined;

b) depending on the result from step a), the delayed and the undelayed video signal are assigned to at least two different processing channels;

c) in each processing channel, the absolute value of the difference between the video signals is generated;

d) a maximum of the absolute values of the difference between the video signals is calculated in each case within a plurality of search windows; and e) a minimum is determined from the maxima in each processing channel, which minimum corresponds to the respective peak value of the noise signal.

One advantage of this method is that at least two different peak values are determined for the noise signal. This advantage is manifested in particular when the video signal is generated by a film scanner. The film grain noise depends to a very great extent on the exposure of the film or the exposure of the different colour layers. The method according to the invention enables an improved noise suppression in the video signals and thus an improved picture quality.

In one development of the method according to the invention, the peak values of the noise signal individually, their maximum or their mean value is used in a subsequent signal processing of the video signal.

In an advantageous manner, video signals of different amplitude ranges are assigned to the different processing channels. By way of example, the amplitude ranges of from 40% to 100% and from 0% to 60% may be selected, where 100% corresponds to the maximum permissible amplitude.

Furthermore, it may be provided that the amplitude ranges overlap, and a video signal with an amplitude value within the overlap range is simultaneously assigned to both processing channels.

In one modification, the method according to the invention is carried out both for RGB signals and for YUV signals.

In order to avoid erroneous noise measurements, provision may be made for rejecting a search window for the purpose of noise signal determination if the amplitude of the video signal in this search window lies outside the permitted amplitude ranges of the processing channels.

In an expedient manner, in the case of a rejected search window, the amplitude maximum is replaced by a predetermined data word. The respective peak value of the noise signal may be replaced by another predetermined data word if all the search windows have been rejected.

Finally, it is also possible for the other predetermined data word to be replaced by the respective last valid peak value of the noise signal.

Further it is desirable to specify a circuit which is suitable for carrying out the method according to the invention. This is achieved by means of a circuit according to claim 10.

The invention's circuit for determining the noise component in a video signal has a delay device which delays the video signal of a preceding picture such that it is simultaneously present at the same time as the video signal of the directly succeeding picture simultaneously at the inputs at an evaluation device. The evaluation device comprises means for difference and absolute value formation, which generate a difference output signal, means for determining the amplitudes of the video signals and logic combination means, which feed the difference output signal in accordance with predetermined rules to at least two different processing channels. Each processing channel has a maximum peak value measuring circuit, whose input is in each case connected to an output of the logic combination means, which is triggered by a first start signal and, within predetermined search windows, in each case determines a maximum value of the difference output signal. Furthermore, provision is made of a first register for storing the maximum values, and also a minimum peak value measuring circuit, whose input is connected to the output of the first register and to which a second start signal is applied. Finally, a second register is provided in order to store the maxima of the minimum peak value measuring circuit, to which second register the second start signal is likewise applied and at the output of which second register the peak value of the noise signal can be tapped off.

In one embodiment of the invention, the maximum peak value measuring circuit and the first register are triggered by a first start pulse. In an advantageous manner, the minimum peak value measuring circuit and the second register are triggered by a second start pulse.

It may also be provided that the evaluation device of the circuit according to the invention comprises a 2- in -1 multiplexer, which optionally switches through the absolute value of the difference between the video signals or a first predetermined data word at the output of the evaluation device. Such a 2-in-1 multiplexer may expediently be provided in each processing channel.

In order to avoid the outputting of an erroneous measurement result for the peak value of the noise signal a decoder (54) may advantageously be provided, by means of which an erroneous peak value of the noise signal can be replaced by a second predetermined data word or by the last valid peak value of the noise signal.

Finally a film scanner is proposed which is equipped with a circuit according to the invention.

This is achieved by means of a film scanner according to claim 16.

An exemplary embodiment of the invention's circuit for determining a noise component in a video signal is illustrated schematically and in a simplifying manner in the drawing, in which:

BRIEF DESCRIPTION OF THE DRAWINGS

FIG. 2 shows a schematic illustration of the search windows as are used for determining a parameter of the video signal.

DETAILED DESCRIPTION OF PREFERED EMBODIMENTS

Figure 1:
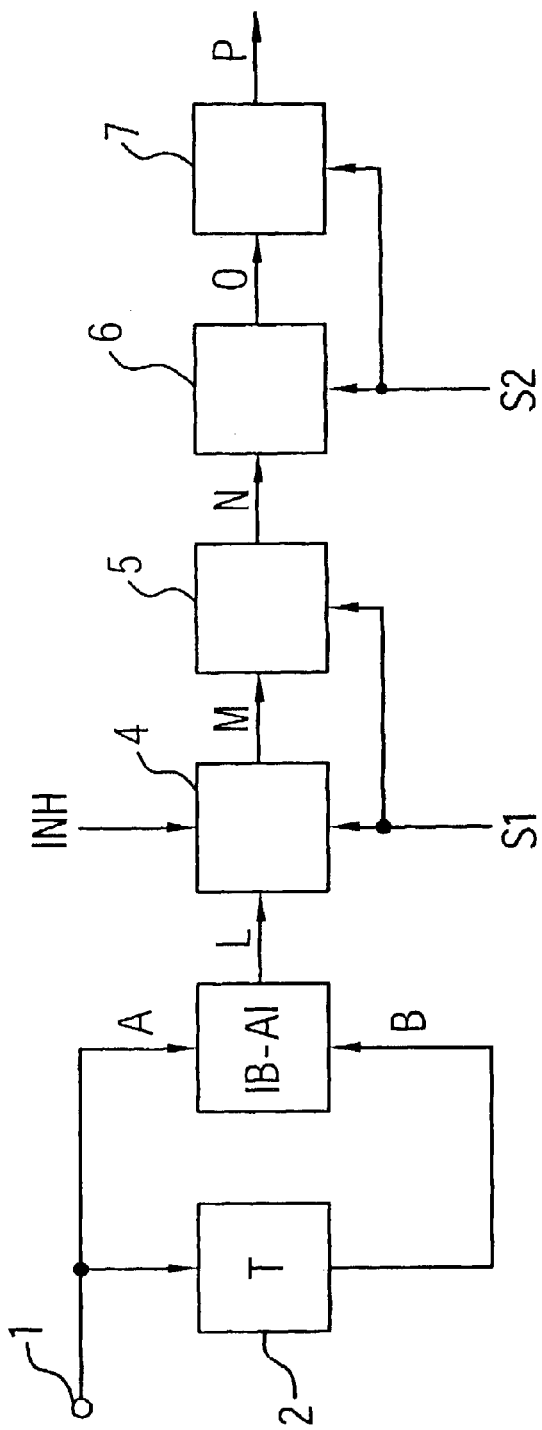
FIG. 1 shows a block diagram of a circuit for determining the noise component in a video signal as is known from the prior art.

FIG. 1 illustrates a block diagram of a known circuit arrangement for determining a noise component of a video signal. A video signal affected by noise interference is present at a terminal 1, which video signal is fed on the one hand directly, and on the other hand via a delay device 2, to the inputs of a device 3 for difference value and absolute value formation. In the case illustrated, the delay device 2 delays the video signal by the duration of one frame. Such delay devices are known in the prior art and are expediently realized with the aid of a digital frame memory. The device 3 forms the difference between the undelayed and the delayed video signal and the absolute value thereof, since the influence on noise reduction is intended to be independent of the sign of the change in the picture content.

The difference signal which can be tapped off at the output, which signal is designated as motion signal L for short in FIG. 1, practically comprises only the rectified noise component of the video signal in the case of unmoving pictures but, in the case of moving pictures, comprises the magnitude of the difference signal values of two successive pictures with superposed rectified noise. The motion signal L is fed to a maximum peak value measuring circuit 4, in which the amplitude maximum is ascertained within a search window SF. The search windows must be chosen to be small enough that it is possible to find at least one of the search windows in the entire picture in which no motion occurs. A search window size of 12 pixels×8 lines is well suited in the case of a video signal with standard resolution in 4:3 format. It goes without saying that other search window sizes are also possible, in particular if a video signal with high resolution and/or with a different picture format is present. FIG. 2 illustrates the division of a frame into 6×6 search windows. Depending on the application, it is also possible to choose a larger or smaller number of search windows.

The search for the maximum is in each case initialized with a start pulse S1 having the initial value M=0. If a larger value (L>M) occurs during a search, then it is detected as new reference value. With the next start pulse S1, the last N value is accepted into a register 5 and at the same time a new maximum search is started. The start pulse S1 occurs at the beginning of each search window, so that, at the end of each search section, the signal N yields the sought peak value of the noise in each case in a search window. For the case where the video signal is a television signal, in the vertical blanking interval of the video signal, the maximum search is interrupted by a pulse INH applied to a control input. From the maximum values stored in the register 5, a minimum peak measuring circuit 6 determines a minimum value. The minimum value is held in a downstream register 7 and output at the end of a measurement period as sought peak value of the noise. The minimum peak value measuring circuit 6 and the register are triggered with a start pulse S2 which occurs at the beginning of a measurement period. The length of the measurement period corresponds to the representation duration of a frame.

Figure 3:
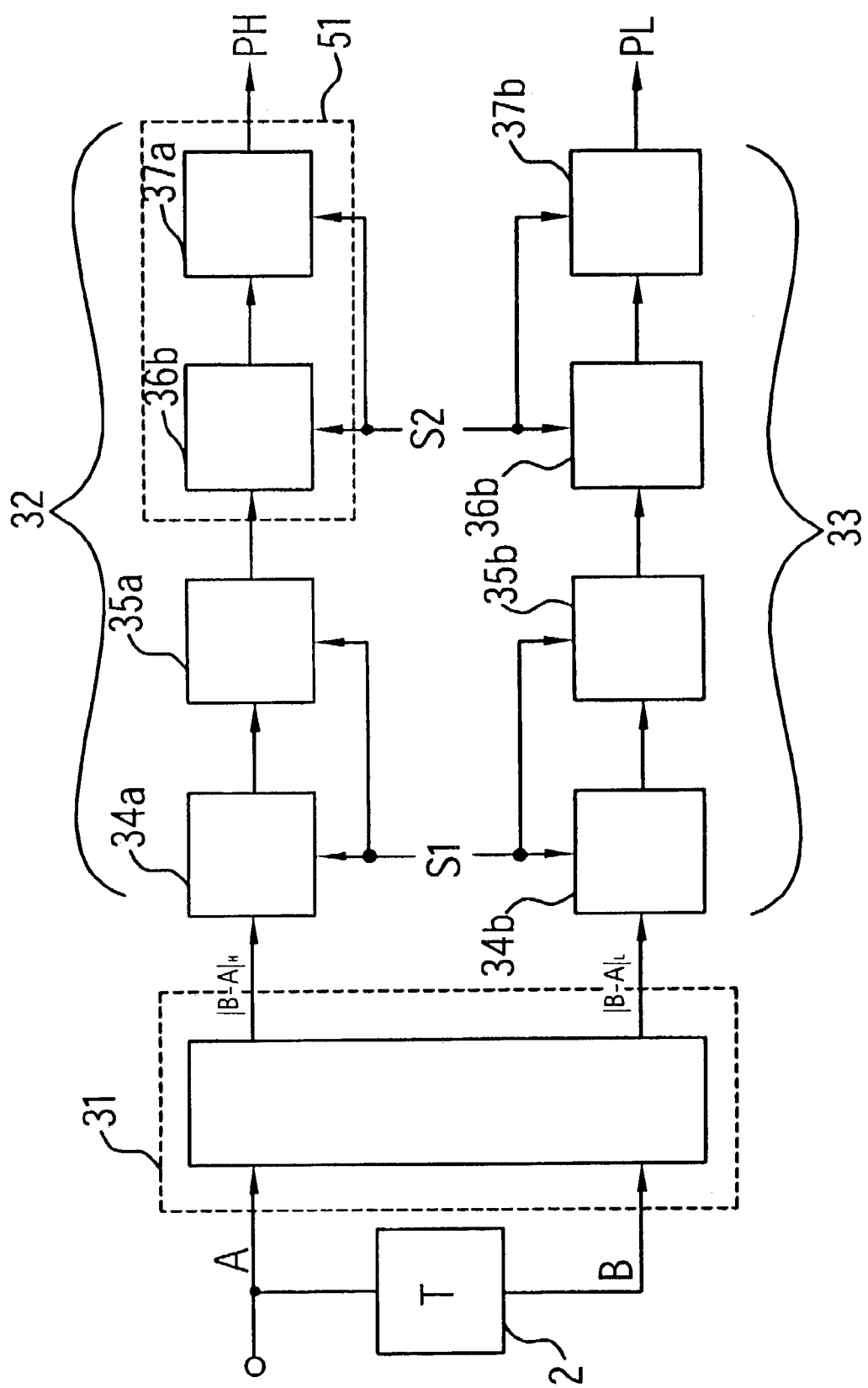
FIG. 3 shows a block diagram of a circuit according to the invention.

A circuit according to the invention for determining a noise component in a video signal is illustrated schematically in a block diagram in FIG. 3. The circuit has an evaluation unit 31, two video signals A and B being present at the two inputs thereof. The video signal B is delayed relative to the video signal A by the delay stage 2, as has already been explained in connection with FIG. 1. In the evaluation unit 31, the video signals A and B are assigned to two different processing channels depending on their amplitudes, as will be explained in more detail below. The upper processing channel 32 is allocated video signals with amplitudes in the range from 40% to 100%, while the lower processing channel 33 is allocated video signals with amplitudes in the range from 0% to 60%. In this case, an amplitude of 100% corresponds to the maximum permissible amplitude of the circuit, and an amplitude of 0% corresponds to an amplitude having the value 0. The aforementioned ranges have only been provided as preferred examples. Other ranges of values may be selected in other exemplary embodiments, and the overlap range between the individual processing channels may also be chosen differently. The invention is also not restricted to those circuits which have only two processing channels, rather it is also possible to provide further processing channels. The fundamental method of operation of the invention remains unaffected by this.

Depending on the amplitude value of the video signal, the evaluation unit 31 assigns the video signals A and B to one of the processing channels 32 and 33, respectively. Accordingly, the evaluation unit 31 forms the difference values between the two video signals, and then the absolute values. In a maximum peak value measuring circuit 34a, within search windows, the maximum of the absolute difference values of the video signals is determined and stored in a register 35a. In this case, the search windows are again chosen with a size of 12 pixels×8 lines, it also being possible to choose other sizes of the search windows. The division of a frame into a number of search windows is illustrated in FIG. 2 and has already been explained in connection with FIG. 1. From these stored maximum values, the minimum of all the maxima stored in the register 35a is determined in a minimum peak value measuring circuit 36a, stored in a register 37a and output as peak value PH of the noise signal at an output. The maximum peak value measuring circuit 34a and the register 35a are triggered with the start pulse S1 which occurs at the beginning of each search window, whereas the minimum peak value measuring circuit 36a and the register 37a are triggered with the start pulse S2 which occurs at the beginning of each frame.

Video signals which lie in the lower amplitude range from 0% to 60% are processed further in a corresponding manner in the processing channel 33. Mutually corresponding elements in the processing channels bear corresponding reference symbols which differ from one another by the indices a and b, respectively. The signal processing in the two processing channels 32 and 33 is identical, so that repetition can be dispensed with. At an output of a register 37b, a peak value PL of the noise signal is ultimately available for those video signals whose amplitudes lie in the lower amplitude range.

The noise determination described thus far can be applied both to RGB signals and to YUV signals, the noise being determined separately for each component signal in both cases.

Figure 4:
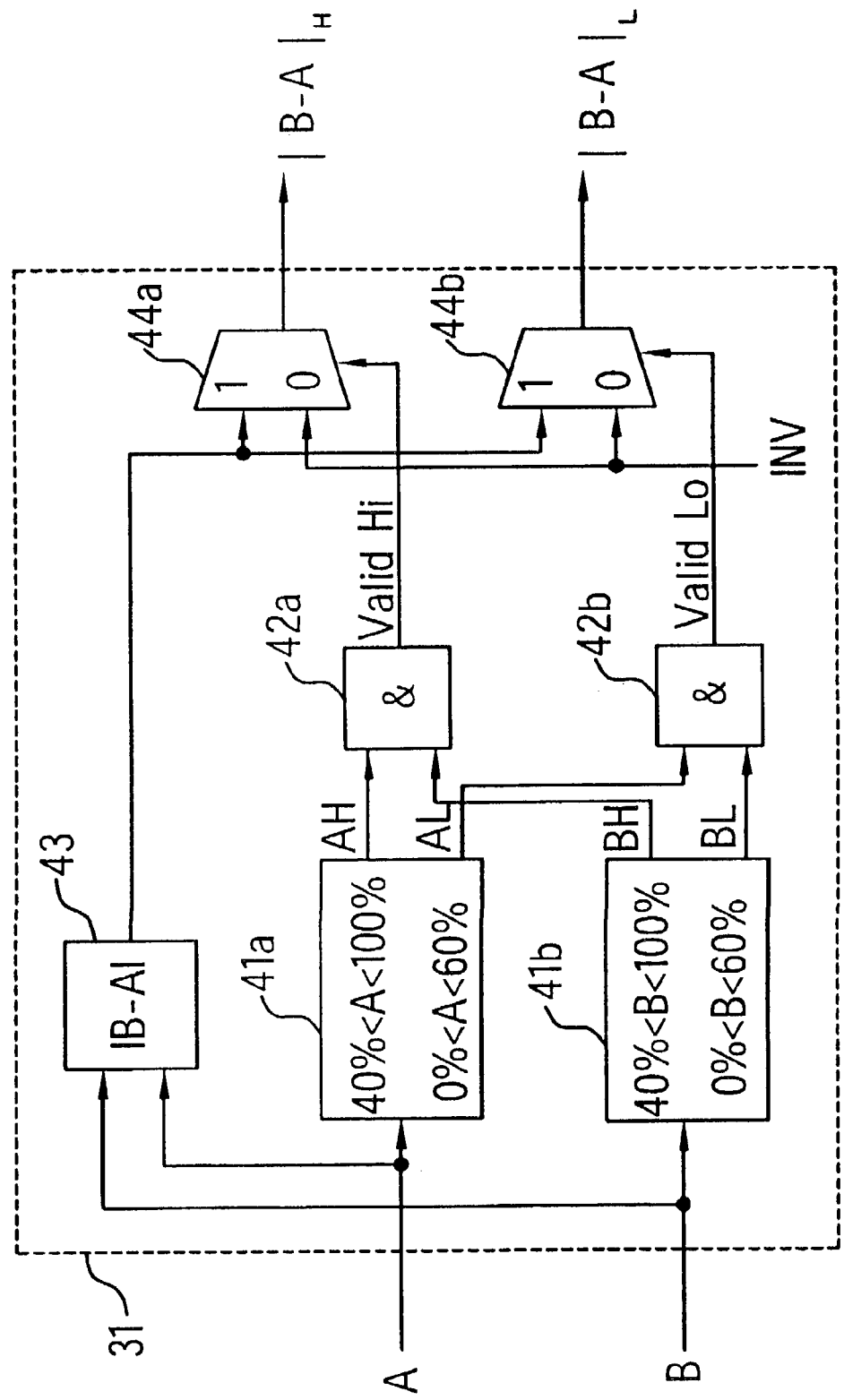
FIG. 4 shows a schematic illustration of the evaluation unit from FIG. 3 in greater detail.

FIG. 4 illustrates the evaluation unit 31 from FIG. 3 in greater detail. The incoming video signals A, B are in each case fed to a comparator unit 41a and 41b, respectively, in order to ascertain the amplitude range in which the amplitudes of the video signals A and B lie. If the amplitudes lie in a range from 40% to 100%, the comparator units 41a and 41b in each case output an output signal AH and BH, respectively, at their first output. If the amplitudes of the signals lie in a range from 0% to 60%, the comparator units 41a and 41b in each case output a second output signal AL and BL, respectively, at their second output. The output signals AH and BH are logically ANDed with one another in a first gate 42a. If both signals AH and BH are "high", then the first gate 42a generates an output signal Valid-Hi. In an entirely corresponding manner, the output signals AL and BL are logically ANDed with one another in a second gate 42b. If both output signals AL and BL are "high", then the second gate 42b generates an output signal Valid-Lo. The video signals A and B which are fed to the comparator units 41a and 41b are simultaneously applied to the inputs of a difference value and absolute value forming unit 43, whose output signal |B−A| represents the absolute value of the difference between the two input signals. The output signal |B−A| is fed to the respective first input of a first and second 2-in-1 multiplexer 44a and 44b, respectively. An INV signal is present at the respective second input of the first and second multiplexers. In the present exemplary embodiment, the INV signal chosen is a date word in which all the bits are set to "high". The control input of the first multiplexer 44a is connected to the output of the first gate 42a, so that the multiplexer 44a outputs the absolute difference value signal |B−A| if the Valid-Hi signal is "high". In order to clarify that this difference value signal is generated from video signals A, B whose amplitudes lie in the upper amplitude range, it is designated by $|B-A|_H$ in FIG. 4. On the other hand, if the Valid-Hi signal is "low", the multiplexer 44a outputs the INV signal. The control input of the second multiplexer 44b is connected to the output of the second gate 42b, so that the multiplexer 44b outputs the absolute difference value signal |B−A| if the Valid-Lo is "high". In order to clarify that this difference value signal is generated from video signals A, B whose amplitudes lie in the lower amplitude range, it is designated by $|B-A|_L$ in FIG. 4.

On the other hand, if the Valid-Lo signal is "low", the multiplexer 44b outputs the INV signal.

In customary pictures, video signals occur with amplitude values of between 0% and 100%, so that corresponding video signals are processed in both processing channels 32, 33 and expedient peak values for the noise signal are output after each minimum search. However, it can also happen that a scene is cross-faded to black or white, so that no differences occur between the video signals A and B over the time duration of a plurality of pictures. In this case, the INV signal is generated, in which all the bits are set to "high", in order to avoid an erroneous measurement. In order to process the INV signal further, two solutions are proposed according to the invention.

Figure 5:
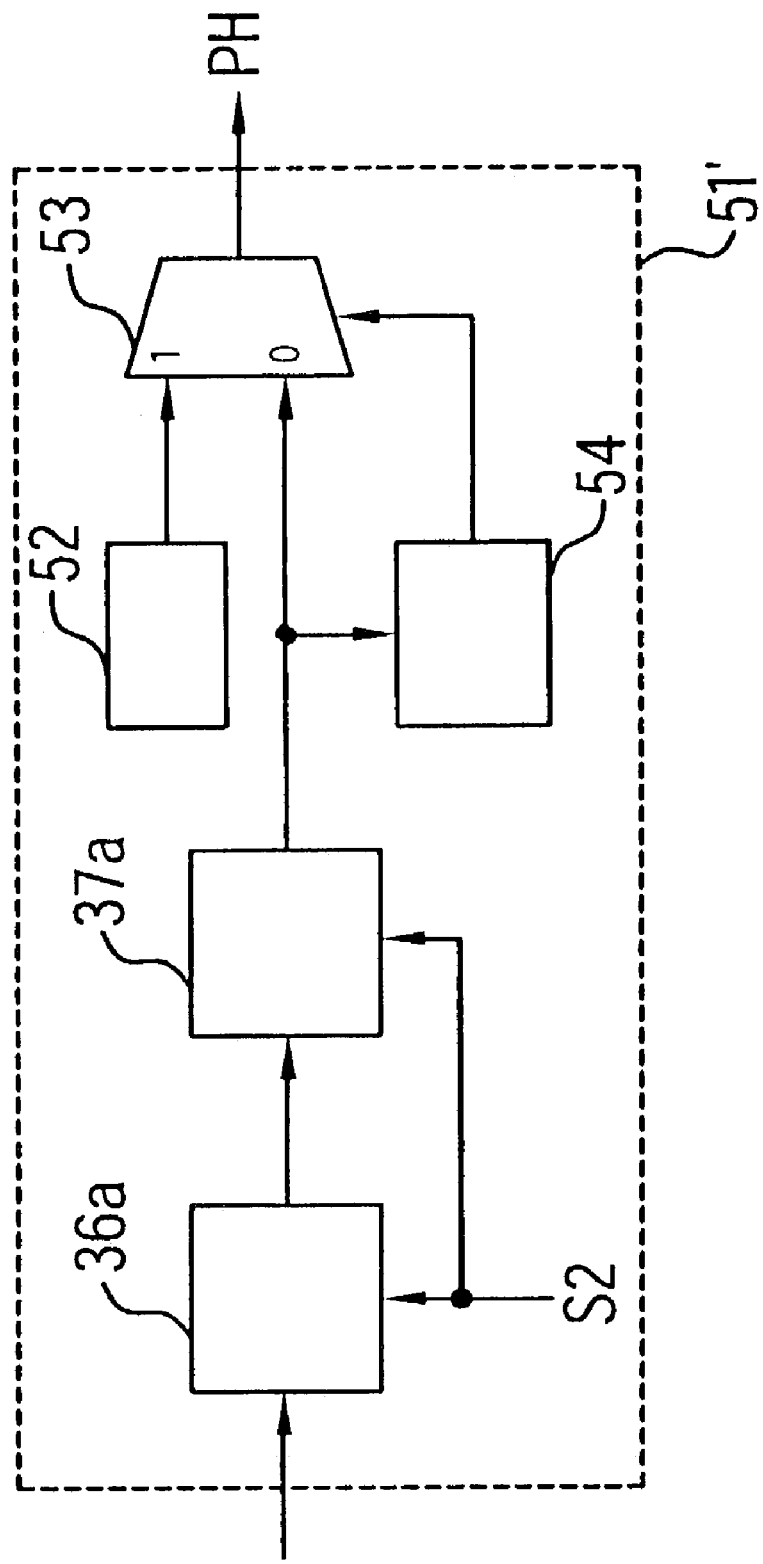
FIG. 5 shows a modification of the exemplary embodiment from FIG. 3.

The first solution is illustrated in FIG. 5, only the processing channel 32 being illustrated for the sake of clarity. The circuit illustrated in FIG. 5 is designated as a whole by the reference symbol 51' and is indicated by a dashed line and designated by the reference symbol 51 in FIG. 3. A corresponding circuit for the second processing channel 33 is not illustrated in the figures. In addition to the minimum peak value measuring circuit 36a and the register 37a, which have already been described in connection with FIG. 3, the circuit 51 has an element 52 which generates a data word containing all zeros. The element 52, which is referred to as zero element for short, is connected to the first input of a 2-in-1 multiplexer 53. The output of the register 37a is connected both to the second input of the multiplexer 53 and to the input of a decoder 54, which ascertains whether all the bits are set to "high" in the case of the data word output by the register 37a. The output of the decoder 54 is connected to the control input of the multiplexer 53. If the decoder 54 ascertains that a data word in which all the bits are "high" is read from the register 37a, then the output of the decoder 54 goes to "high". This has the consequence that the multiplexer 53 switches through the output signal of the zero element 52 to the output. In all other cases, the output of the decoder remains at "low", and the multiplexer 53 switches through to its output the data word read from the register 37a. The circuit 51 thus causes a data word in which all the bits are set to "high" to be converted into a data word in which all the bits are set to "low". Consequently, the peak value of the noise signal is also zero in these cases. This selection is expedient because no noise signal has to be taken into account if no video signals occur which lie within the permitted amplitude range.

Figure 6:
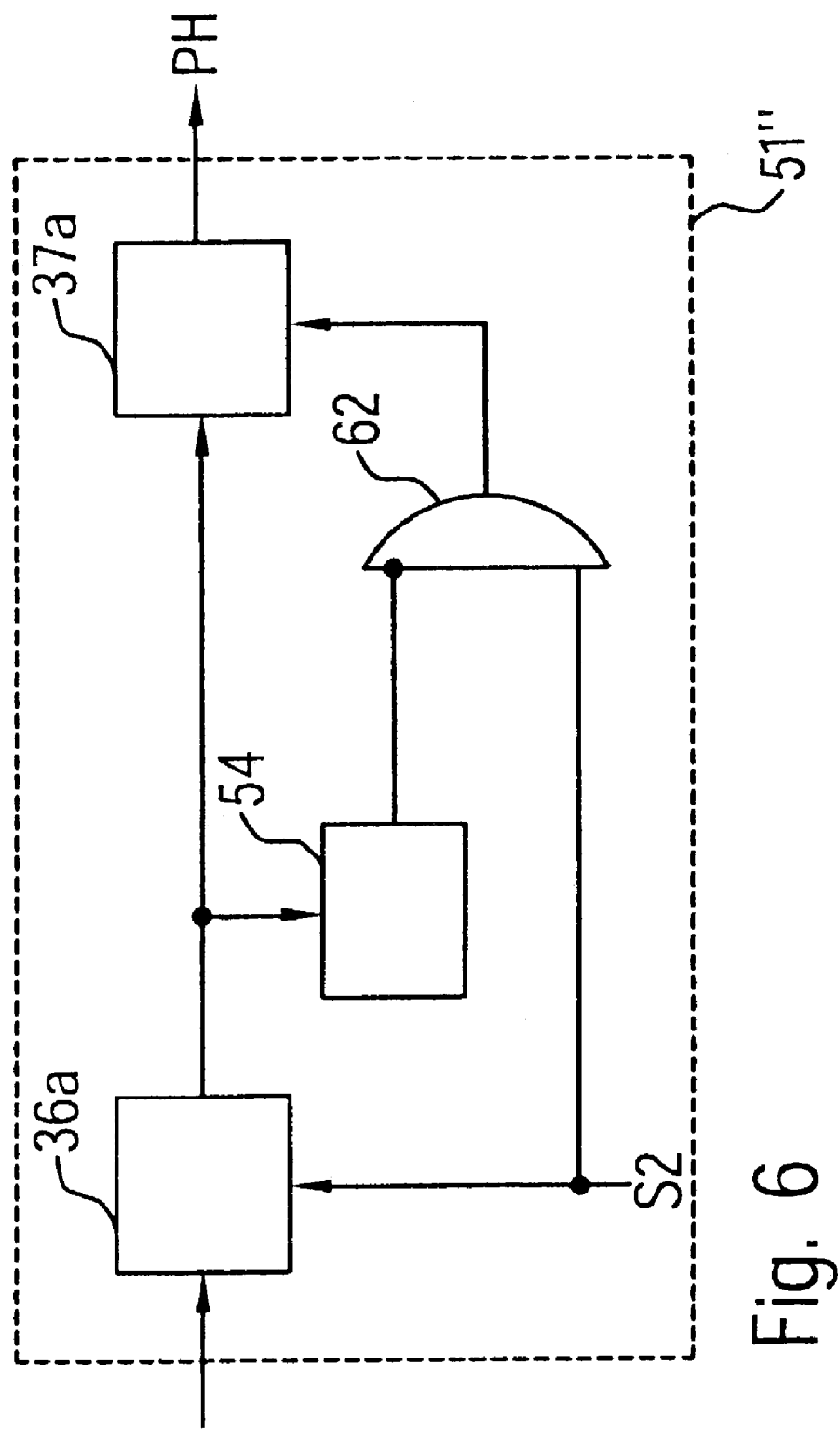
FIG. 6 shows a further modification of the exemplary embodiment from FIG. 3.

FIG. 6 schematically illustrates a second circuit for avoiding erroneous noise measurements. This circuit is designated as a whole by the reference symbol 51" and can be arranged as an alternative to the circuit 51' illustrated in FIG. 5 in the block illustrated with the reference symbol 51 in FIG. 3. In the case of the circuit 51", the output of the minimum peak value measuring circuit 36a is connected to the input of the register 37a and to the input of the decoder 54. The output of the decoder 54 is connected to an inverting input of an AND element 62, the start pulse S2 being present at the second non-inverting input thereof. The output of the AND element 62 is connected to the control input of the register 37a, so that the last valid peak value of the noise signal is held in the register 37a as long as data words in which all the bits are set to "high" are detected by the decoder 54. With each start pulse S2, a new minimum search routine is started, while the last valid value remains at the output of the register 37a.

The circuits described in FIGS. 5 and 6 can also be used in an entirely corresponding manner in the second processing channel.

What is claimed is:

1. Method for determining a noise component in a video signal wherein the method comprises the following steps:
   a) delaying the video signal;
   b) forming the difference between the video signal and the delayed video signal, and determining the absolute value of the difference;
   c) determining the amplitudes of the delayed and the undelayed video signal;
   d) depending on the amplitudes determined in the preceding step, the absolute value of the difference between the delayed and the undelayed video signal is provided to one or two of an at least two different processing channels;
   e) calculating, in each processing channel, within a number of search windows, a maximum of the absolute values of the difference between the video signals for the respective search window, wherein a search window is rejected for the purpose of noise signal determination if the amplitude of the video signal that was used for determining an absolute difference value within this search window lies outside the permitted amplitude range of the respective processing channel;
   f) determining a minimum from the maxima in each processing channel, which minimum corresponds to the respective peak value of the noise component of the signal.

2. Method according to claim 1, wherein the peak values of the noise signal individually, their maximum or their mean value is used in a subsequent signal processing of the video signal.

3. Method according to claim 1, wherein the absolute value of the difference between the delayed and the undelayed video signal is provided to different processing channels for video signals lying in different amplitude ranges.

4. Method according to claim 3, wherein the amplitude ranges overlap, and wherein, for a video signal with an amplitude within the overlap range the absolute value of the difference between the delayed and the undelayed video signal is provided to both processing channels.

5. Method according to claim 1, wherein it is carried out both for RGB signals and for YUV signals.

6. Method according to claim 1, wherein, in the case of a rejected search window, the amplitude maximum is replaced by a predetermined data word.

7. Method according to claim 1, wherein the respective peak value of the noise signal is replaced by a predetermined data word if all the search windows have been rejected.

8. Method according to claim 7, wherein the predetermined data word is replaced by the respective last valid peak value of the noise signal.

9. Circuit for determining the noise component in a video signal comprising a delay device which delays the video signal of a preceding picture such that it is present at the inputs at an evaluation device at the same time as the video signal of the directly succeeding picture, wherein the evaluation device comprises:
   means for determining the absolute value of the difference of the video signal and the delayed video signal, generating an absolute difference value output signal,
   means for determining the amplitudes of the video signal and the delayed video signal and logic combination means, which feed the absolute difference value output signal to one or two of an at least two different processing channels as a function of the amplitudes of the video signal and the delayed video signal, each processing channel having a maximum peak value measuring circuit, whose input is in each case connected to an output of the evaluation device, which, within predetermined search windows, in each case determines a maximum value of the absolute difference value output signal, wherein provision is made of a first register for storing the maximum values, wherein a minimum peak value measuring circuit is provided1 whose input is connected to the output of the first register, and wherein a second register is provided in order to store the maxima of the minimum peak value measuring circuit and the peak value of the noise signal can be tapped off at the output of the said second register, wherein a search window is rejected for the purpose of noise signal determination if the amplitude of the video signal that was used for determining an absolute difference value within this search window lies outside the permitted amplitude range of the respective processing channel.

10. Circuit according to claim 9, wherein the maximum peak value measuring circuit and the first register are triggered by a first start pulse.

11. Circuit according to claim 9, wherein the minimum peak value measuring circuit and the second register are triggered by a second start pulse.

12. Circuit according to claim 9, wherein a respective 2-in-1 multiplexer is provided in each processing channel.

13. Circuit according to claim 9, wherein a decoder is provided, by means of which an erroneous peak value of the noise signal can be replaced by a second predetermined data word or by the last valid peak value of the noise signal.

14. Film scanner which generates a video signal by illuminating or transilluminating a film, wherein the film scanner is equipped with a circuit according to claim 9.

15. Circuit according to claim 9, wherein the evaluation device comprises a 2-in-1 multiplexer, which optionally switches through the absolute value of the difference between the video signals or a first predetermined data word at the output of the evaluation device.

* * * * *